(12) United States Patent
Howard

(10) Patent No.: US 11,843,252 B2
(45) Date of Patent: Dec. 12, 2023

(54) SYSTEM AND METHOD FOR DAMPING SUB-SYNCHRONOUS CONTROL INTERACTIONS IN A GRID-FORMING INVERTER-BASED RESOURCE

(71) Applicant: General Electric Company, Schenectady, NY (US)

(72) Inventor: Dustin Howard, Brookhaven, GA (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 17/538,003

(22) Filed: Nov. 30, 2021

(65) Prior Publication Data

US 2023/0170705 A1 Jun. 1, 2023

(51) Int. Cl.
*H02J 3/38* (2006.01)
*H02J 3/24* (2006.01)
(Continued)

(52) U.S. Cl.
CPC ............ *H02J 3/381* (2013.01); *F03D 7/0284* (2013.01); *F03D 9/257* (2017.02); *H02J 3/241* (2020.01);
(Continued)

(58) Field of Classification Search
CPC .... H02J 3/381; H02J 3/241; H02J 3/40; H02J 3/46; H02J 2300/28; F03D 7/0284;
(Continued)

(56) References Cited

U.S. PATENT DOCUMENTS 5,327,335 A 7/1994 Maddali et al.
5,757,099 A 5/1998 Cheng et al.
(Continued)

FOREIGN PATENT DOCUMENTS

| CN | 109594709 A | 3/2019 |
|---|---|---|
| EP | 2523298 B1 | 11/2012 |
| WO | WO2015131958 A1 | 9/2015 |

OTHER PUBLICATIONS

Miller et al., Design and commissioning of a 5 MVA, 2.5 MWh battery energy storage system, Proceedings of 1996 Transmission and Distribution Conference and Exposition, Los Angeles CA, 1996, pp. 339-345. doi: 10.1109/TDC.1996.545957.

(Continued)

*Primary Examiner* — Joseph Ortega
(74) *Attorney, Agent, or Firm* — Dority & Manning, P.A.

(57) ABSTRACT

A method for damping sub-synchronous control interactions (SSCI) in a grid-forming inverter-based resource connected to an electrical grid includes receiving, via a controller, a current feedback signal in a synchronous reference frame. The method also includes rotating, via the controller, the current feedback signal to a new reference frame associated with a sub-synchronous frequency range. Further, the method includes determining, via the controller, a sub-synchronous component of the current feedback signal. Moreover, the method includes rotating, via the controller, the sub-synchronous component of the current feedback signal back to the synchronous reference frame. In addition, the method includes determining, via the controller, a voltage command associated with sub-synchronous damping for the inverter-based resource as a function of the sub-synchronous component and a virtual resistance setting. Thus, the method includes controlling, via the controller, the inverter-based resource, based at least in part, on the voltage command associated with the sub-synchronous damping.

19 Claims, 10 Drawing Sheets

(51) Int. Cl.
  *H02J 3/46* (2006.01)
  *H02J 3/40* (2006.01)
  *H02P 9/00* (2006.01)
  *F03D 9/25* (2016.01)
  *F03D 7/02* (2006.01)
  *H02M 5/458* (2006.01)
  *H02P 101/15* (2016.01)

(52) U.S. Cl.
  CPC .................................. *H02J 3/40* (2013.01); *H02J 3/46* (2013.01); *H02M 5/4585* (2013.01); *H02P 9/007* (2013.01); *F05B 2270/335* (2013.01); *F05B 2270/337* (2013.01); *H02J 2300/28* (2020.01); *H02P 2101/15* (2015.01)

(58) Field of Classification Search
  CPC ...... F03D 9/257; H02M 5/4585; H02P 9/007; H02P 2101/15; F05B 2270/335; F05B 2270/337
  See application file for complete search history.

(56) References Cited

U.S. PATENT DOCUMENTS

| | | |
  |---|---|---|
  | 5,798,631 A | 8/1998 | Spee et al. |
  | 5,798,633 A | 8/1998 | Larsen et al. |
  | 6,472,775 B1 | 10/2002 | Huang et al. |
  | 7,119,452 B2 | 10/2006 | Larsen |
  | 7,411,309 B2 | 8/2008 | Hudson |
  | 7,425,771 B2 | 9/2008 | Rivas et al. |
  | 7,456,695 B2 | 11/2008 | Weng et al. |
  | 7,804,184 B2 | 9/2010 | Yuan et al. |
  | 8,008,793 B2 | 8/2011 | Andresen |
  | 8,013,461 B2 | 9/2011 | Delmerico et al. |
  | 8,097,971 B2 | 1/2012 | Ichinose et al. |
  | 8,310,074 B2 | 11/2012 | Larsen et al. |
  | 9,270,194 B2 | 2/2016 | Brogan et al. |
  | 9,660,452 B2 | 5/2017 | Routimo |
  | 9,660,453 B2 | 5/2017 | Majumder |
  | 10,156,225 B2 | 12/2018 | Huang et al. |
  | 11,005,401 B1 | 5/2021 | Howard |
  | 2007/0216164 A1 | 9/2007 | Rivas et al. |
  | 2009/0121482 A1 | 5/2009 | Rickard |
  | 2009/0167095 A1 | 7/2009 | Rivas et al. |
  | 2009/0200803 A1 | 8/2009 | Ichinose et al. |
  | 2009/0278351 A1 | 11/2009 | Rivas et al. |
  | 2010/0142237 A1 | 6/2010 | Yuan et al. |
  | 2016/0254769 A1* | 9/2016 | Ren .................. H02P 9/105 290/44 |
  | 2018/0328342 A1 | 11/2018 | Ren et al. |

OTHER PUBLICATIONS

The EP Search Report for EP application No. 22208372.7, dated Apr. 5, 2023, 5 pages.

* cited by examiner

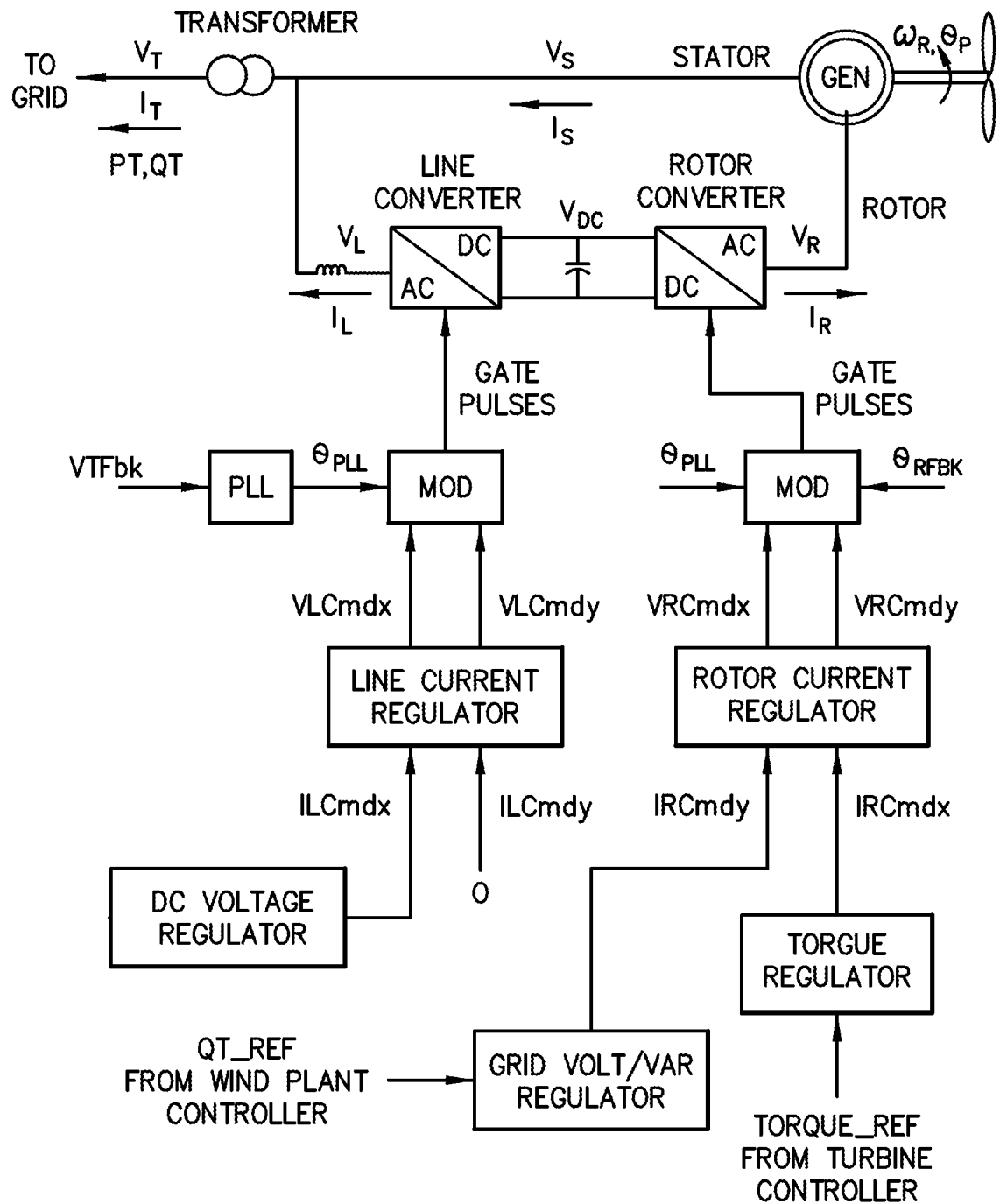
FIG. -1-
PRIOR ART

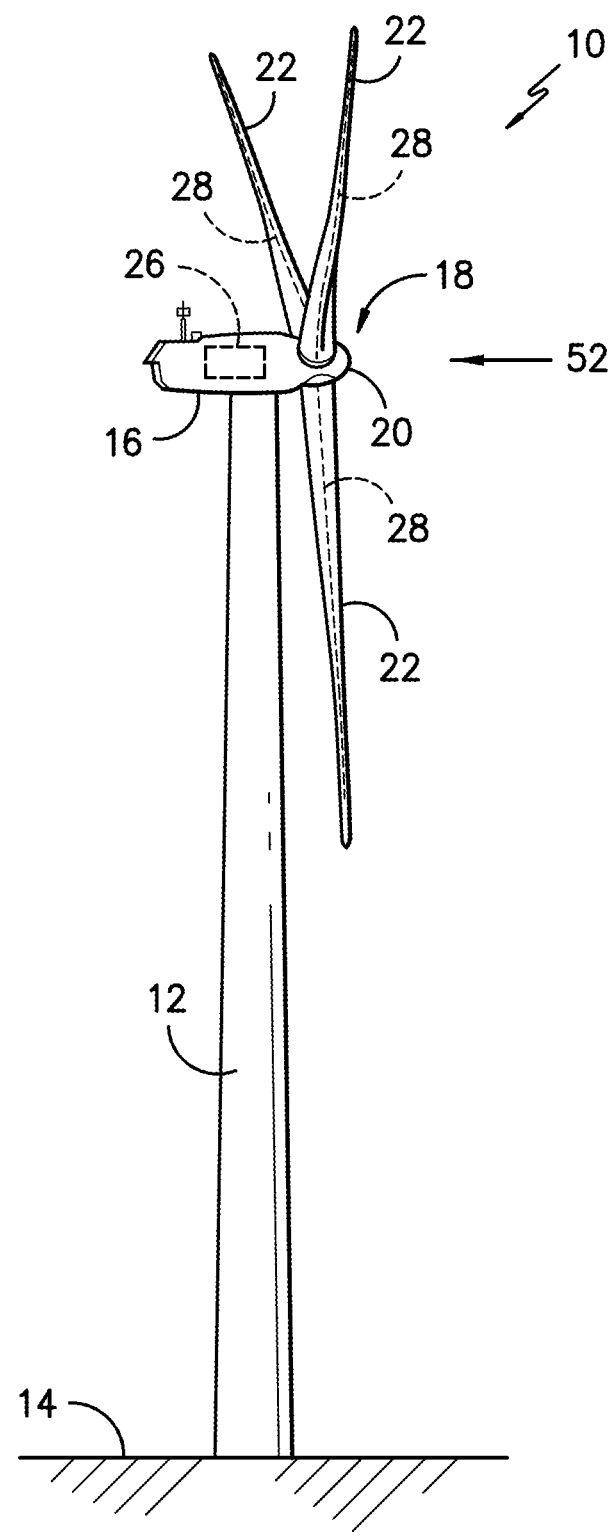
FIG. -2-

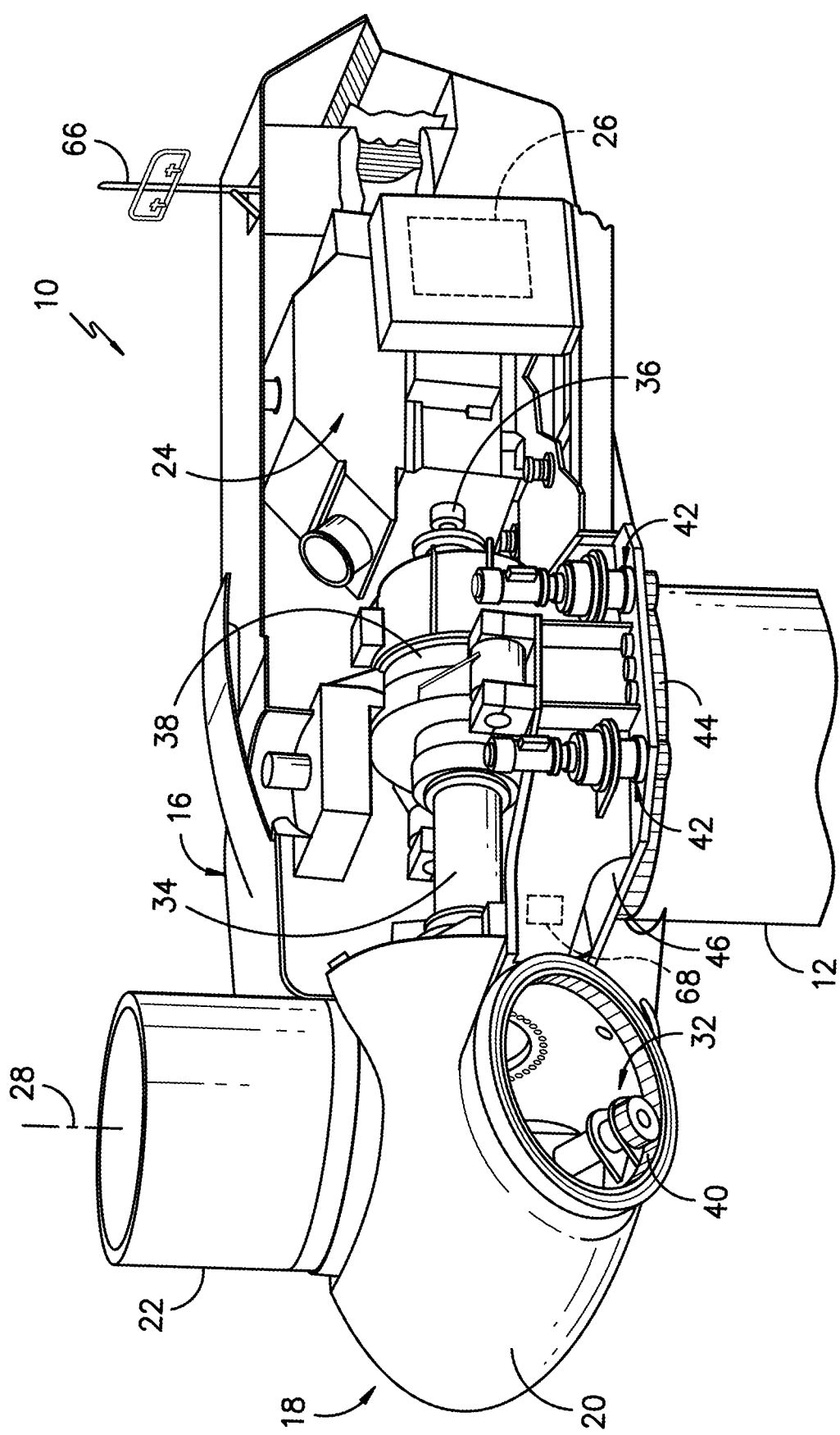
FIG. -3-

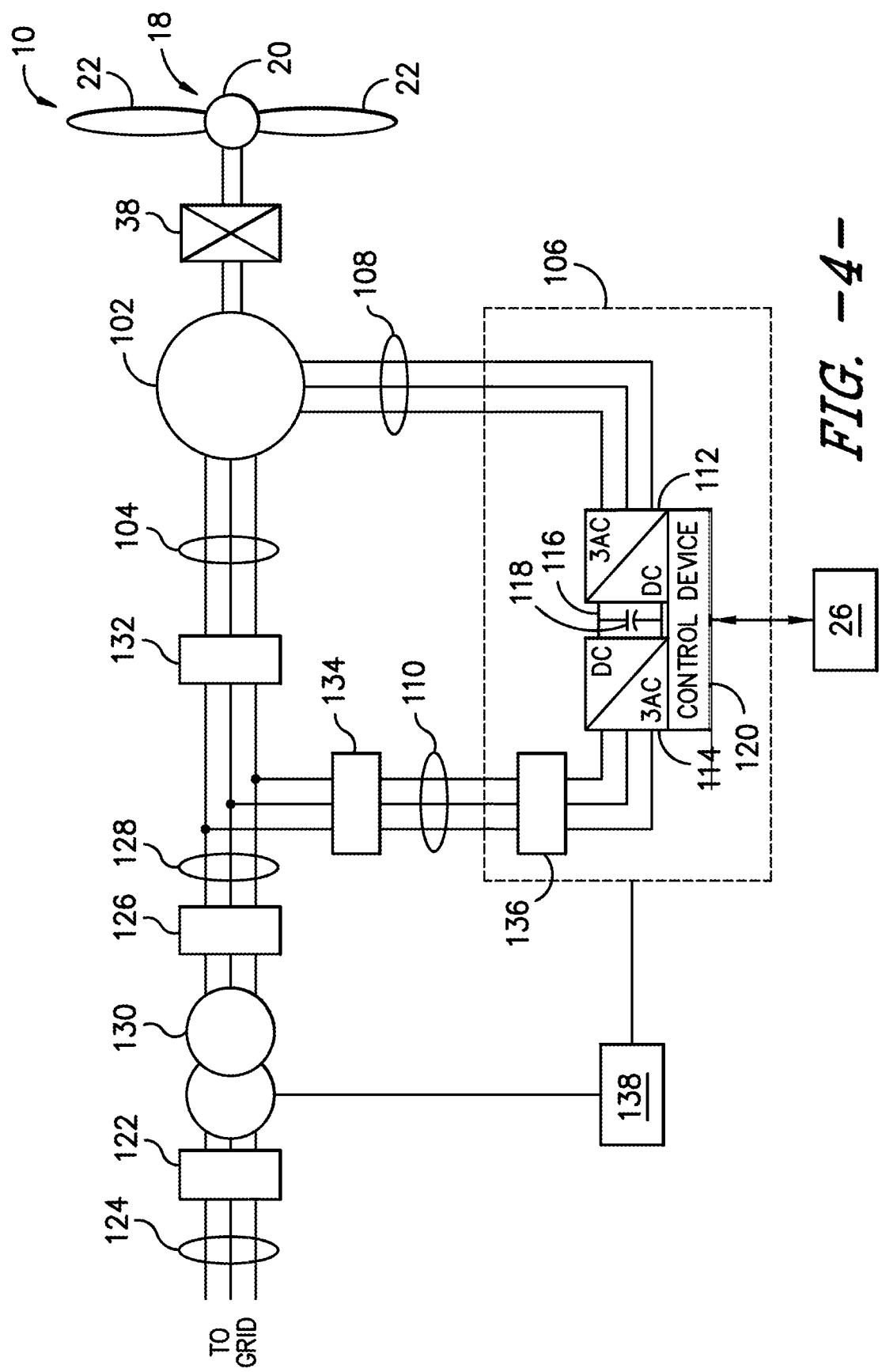
FIG. -4-

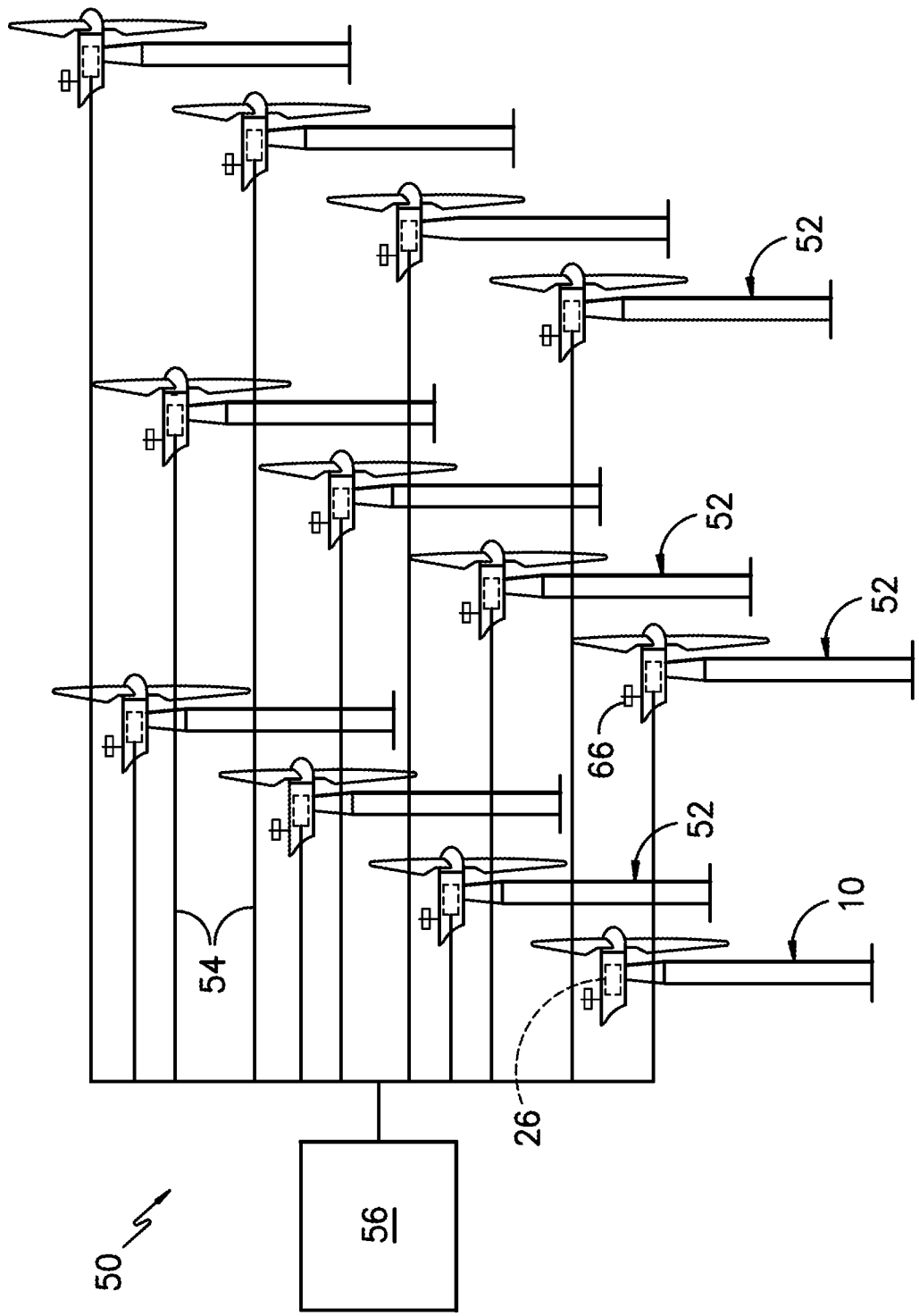

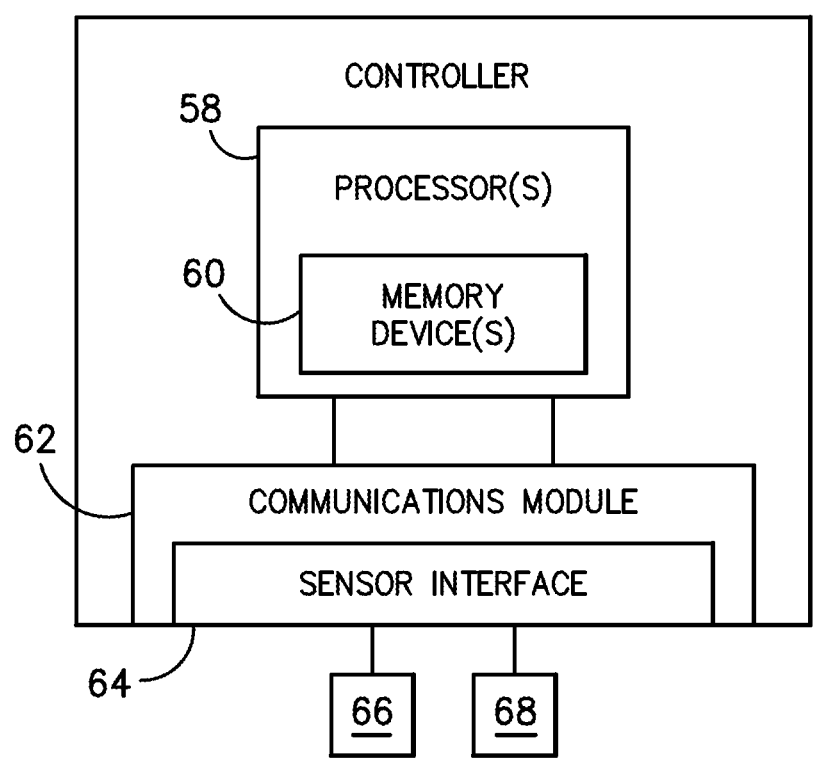
FIG. -6-

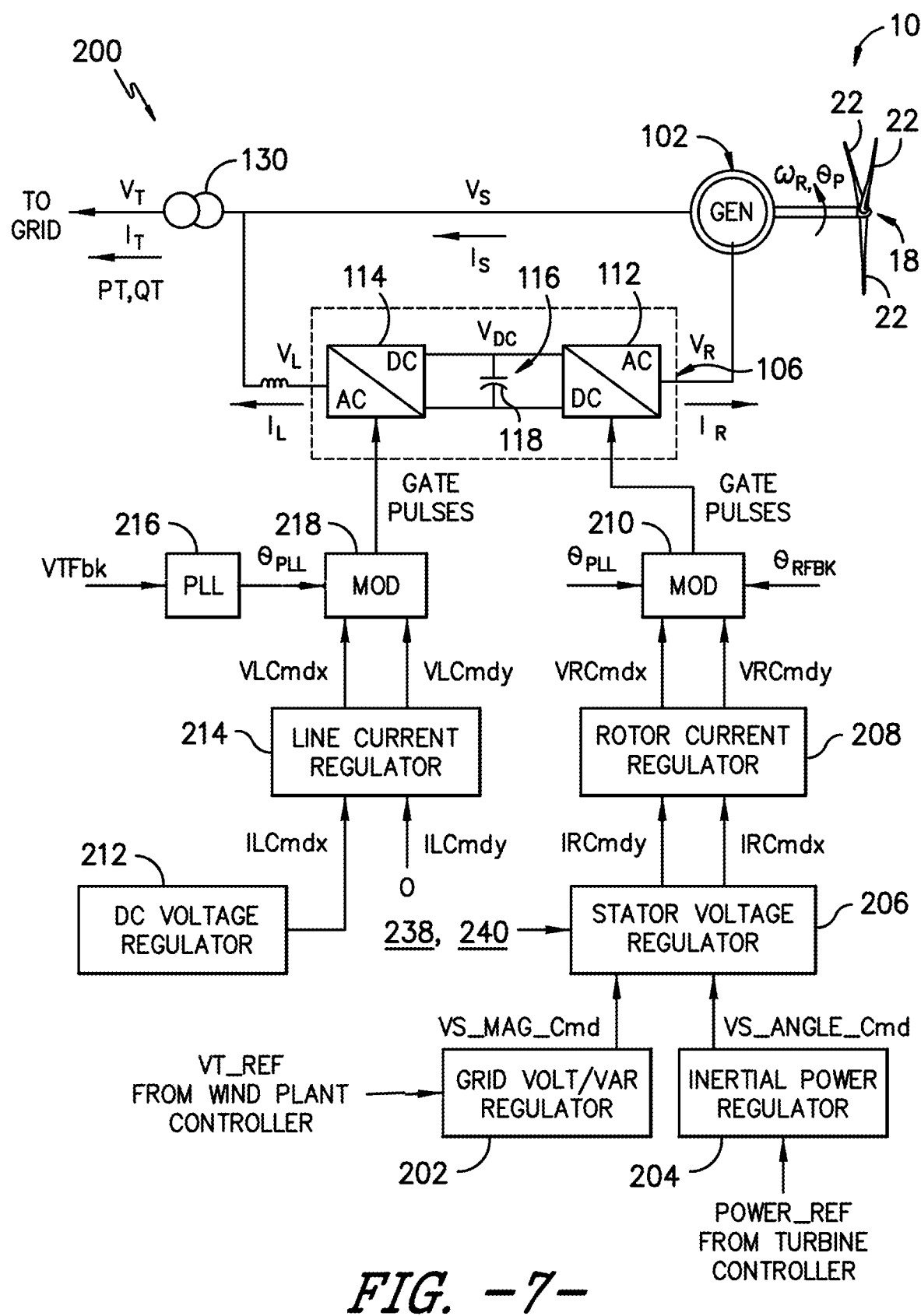
FIG. -7-

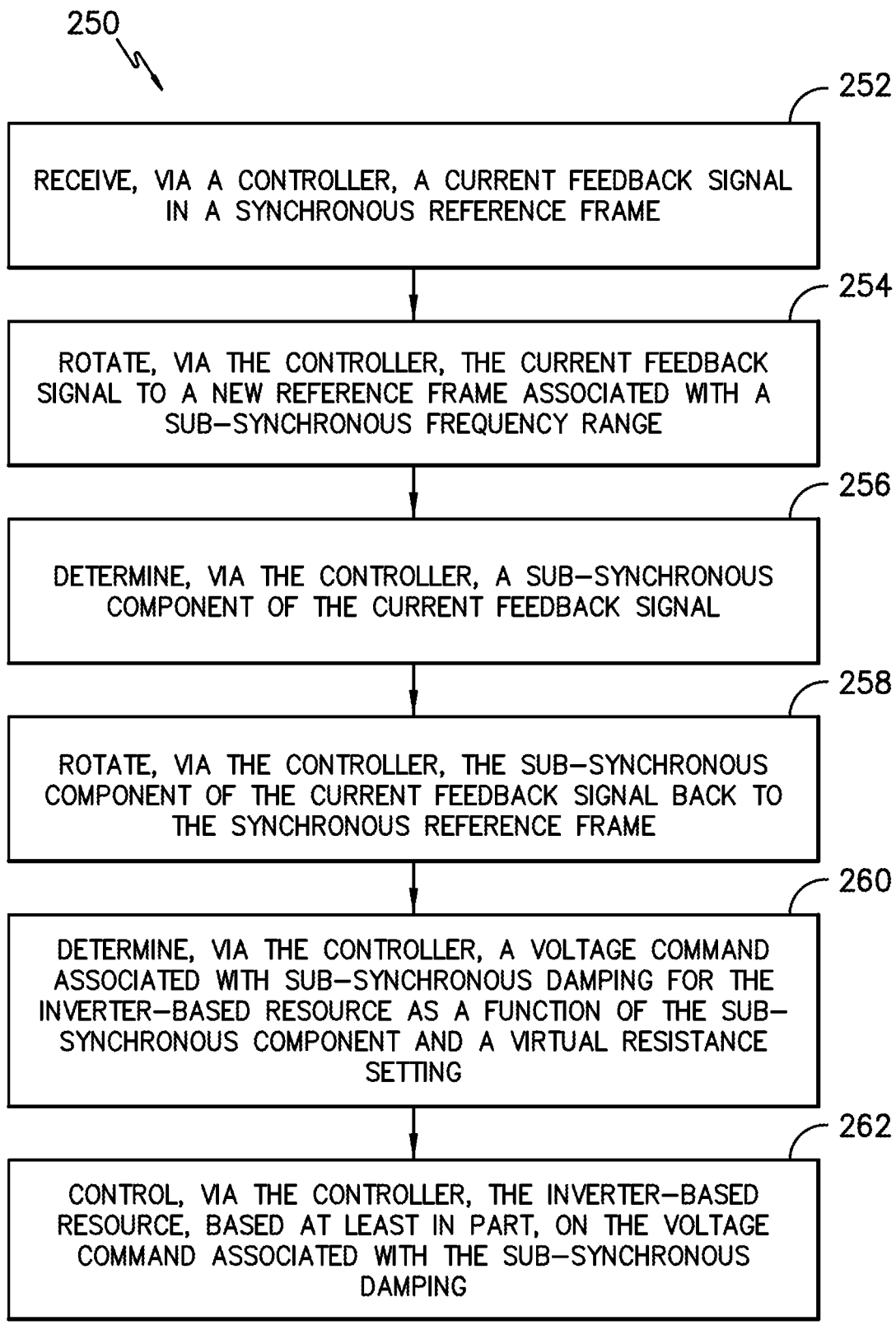
FIG. -8-

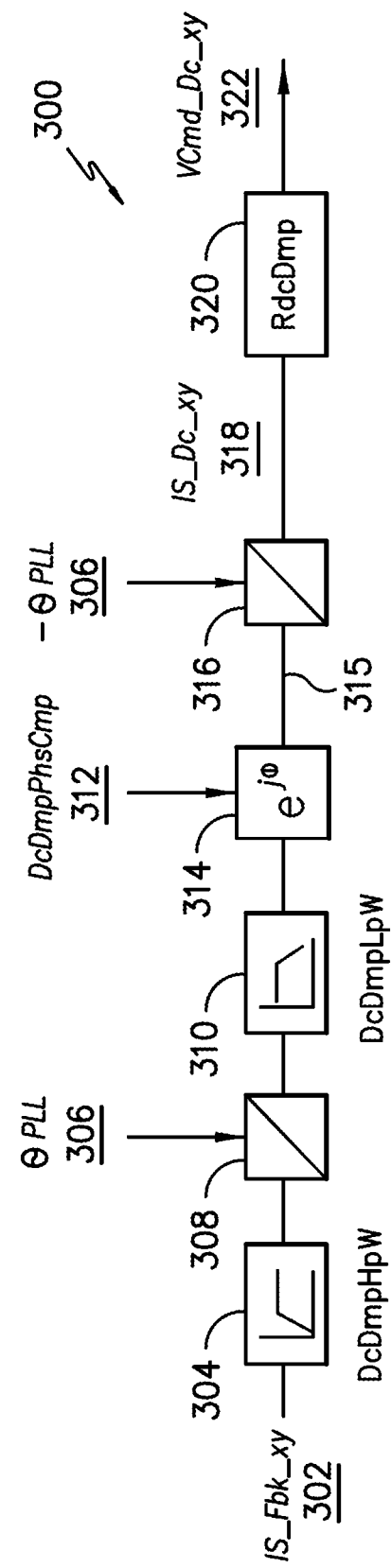
FIG. -9-

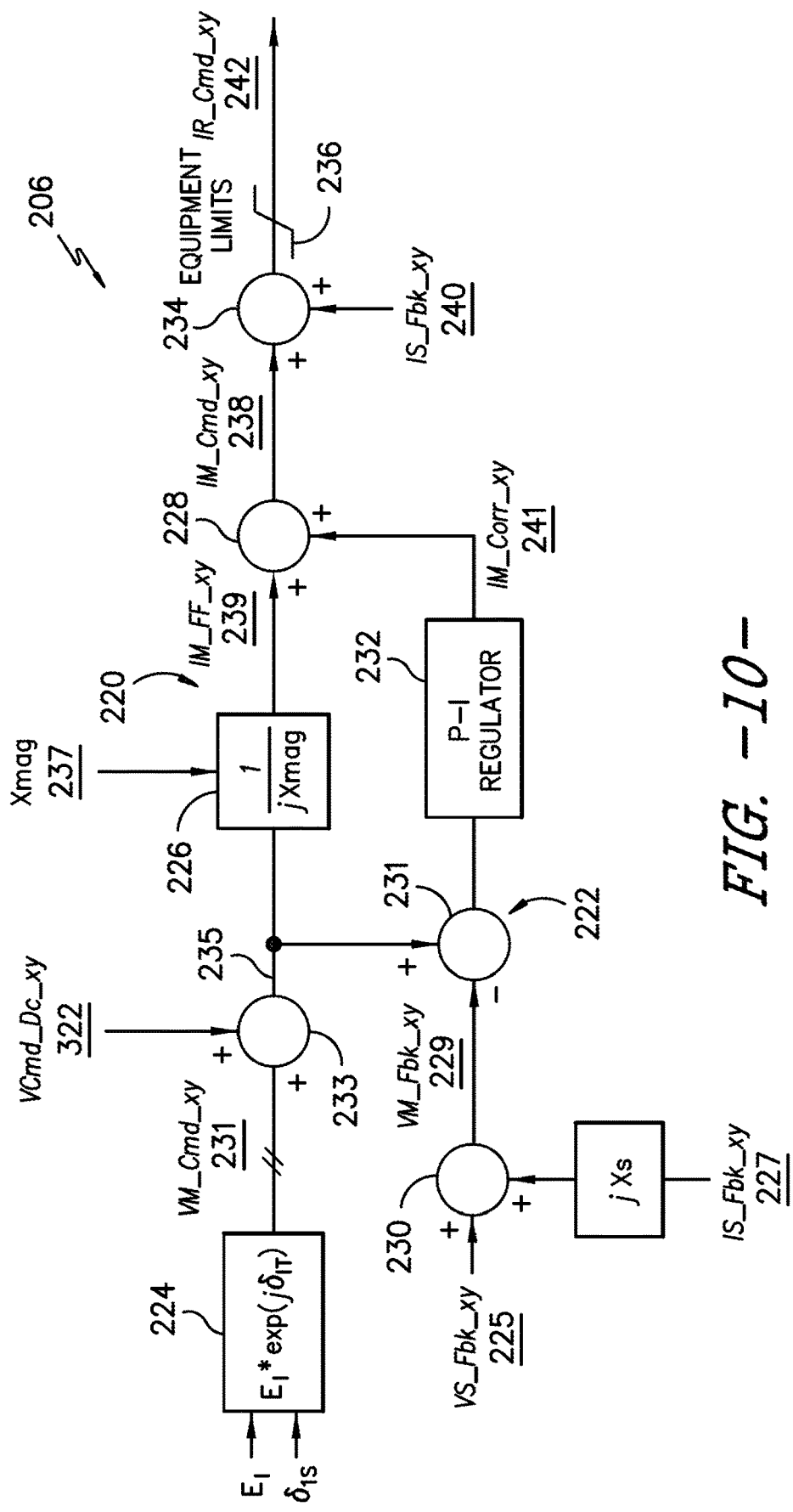
FIG. -10-

SYSTEM AND METHOD FOR DAMPING SUB-SYNCHRONOUS CONTROL INTERACTIONS IN A GRID-FORMING INVERTER-BASED RESOURCE

FIELD

The present disclosure relates generally to inverter-based resources, such as wind turbine power systems and, more particularly, to systems and methods for damping sub-synchronous control interactions (SSCI) in grid-forming inverter-based resources.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g., the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

To be effective, grid-forming (GFM) inverter-based resources (IBRs) must be able to maintain an internal voltage phasor that does not move quickly when there are changes in grid conditions, e.g., sudden addition/removal of loads, opening or closing of grid connections that lead to phase jumps and/or rapid change of frequency. In other words, the power from the grid-forming resource must be able to change suddenly to stabilize the grid, with a subsequent slow reset to power being commanded from a higher-level control function. In addition, the grid-forming resource must be able to rapidly enforce power limits that exist due to constraints on the power-handling portions of the device, e.g., DC voltages/currents in a battery, solar array, and/or wind generating system. Such a response is needed for severe disturbances on the grid, e.g., faults where power limits will be dynamically adjusted to coordinate with grid conditions for secure recovery from the fault. Further, the grid-forming resource should be able to rapidly follow changes in commands from higher-level controls, e.g., for damping mechanical vibrations in a wind turbine. Such requirements, however, can be difficult to achieve.

In addition, at least some known electric utility grids include one or more series-compensated transmission lines. Sub-synchronous control interactions (SSCI) is a phenomenon that occurs when power-electronic converter controls interact with such series-compensated transmission lines. These interactions can sometimes lead to control instabilities if control systems are not tuned properly or if the control margin of the power converter in properly-tuned control systems is not maintained. Moreover, series capacitors are often installed in long-distance AC transmission lines to boost the power transfer capability of the lines. The series capacitor(s) creates a resonant circuit, which may interact with the converter controls of power electronics. Dual-fed wind turbines, in particular, are susceptible to this type of interaction. If not properly damped, the oscillations can be unstable and lead to trips of the wind turbine or overall wind farm.

In view of the foregoing, an improved system and method that addresses the aforementioned issues would be welcomed in the art. Accordingly, the present disclosure is directed to systems and methods damping SSCI in GFM IBRs.

BRIEF DESCRIPTION

Aspects and advantages of the invention will be set forth in part in the following description, or may be obvious from the description, or may be learned through practice of the invention.

In one aspect, the present disclosure is directed to a method for damping sub-synchronous control interactions (SSCI) in a grid-forming inverter-based resource connected to an electrical grid. The method includes receiving, via a controller, a current feedback signal in a synchronous reference frame. The method also includes rotating, via the controller, the current feedback signal to a new reference frame associated with a sub-synchronous frequency range. Further, the method includes determining, via the controller, a sub-synchronous component of the current feedback signal. Moreover, the method includes rotating, via the controller, the sub-synchronous component of the current feedback signal back to the synchronous reference frame. In addition, the method includes determining, via the controller, a voltage command associated with sub-synchronous damping for the inverter-based resource as a function of the sub-synchronous component and a virtual resistance setting. Thus, the method includes controlling, via the controller, the inverter-based resource, based at least in part, on the voltage command associated with the sub-synchronous damping. It should be understood that the method may further include any of the additional features and/or steps described herein.

In another aspect, the present disclosure is directed to a converter controller for damping sub-synchronous control interactions (SSCI) in a grid-forming inverter-based resource connected to an electrical grid. The converter controller includes at least one controller having at least one processor. The processor(s) is configured to perform a plurality of operations, including but not limited to receiving a current feedback signal in a synchronous reference frame, rotating the current feedback signal to a new reference frame associated with a sub-synchronous frequency range, determining a sub-synchronous component of the current feedback signal, rotating the sub-synchronous component of the current feedback signal back to the synchronous reference frame, determining a voltage command associated with sub-synchronous damping for the inverter-based resource as a function of the sub-synchronous component and a virtual resistance setting, and controlling the inverter-based resource, based at least in part, on the voltage command associated with the sub-synchronous damping. It should be understood that the converter controller may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a one-line diagram of a double-fed wind turbine generator with structure of converter controls for grid-following application according to conventional construction;

FIG. 2 illustrates a perspective view of one embodiment of a wind turbine according to the present disclosure;

FIG. 3 illustrates a simplified, internal view of one embodiment of a nacelle according to the present disclosure;

FIG. 4 illustrates a schematic view of one embodiment of a wind turbine electrical power system suitable for use with the wind turbine shown in FIG. 1;

FIG. 5 illustrates a schematic view of one embodiment of a wind farm having a plurality of wind turbines according to the present disclosure;

FIG. 6 illustrates a block diagram of one embodiment of a controller according to the present disclosure;

FIG. 7 illustrates a one-line diagram of a double-fed wind turbine generator with converter controls for grid-forming application according to the present disclosure;

FIG. 8 illustrates a flow diagram of one embodiment of method for damping sub-synchronous control interactions (SSCI) in a grid-forming inverter-based resource connected to an electrical grid according to the present disclosure;

FIG. 9 illustrates a schematic view of one embodiment of a grid-forming control structure of a double-fed wind turbine generator according to the present disclosure; and FIG. 10 illustrates a schematic view of one embodiment of logic to create rotor current commands for stator voltage regulation according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Series capacitors are often installed in long-distance AC transmission lines to boost the power transfer capability of the lines. The series capacitor creates a resonant circuit, which may interact with the converter controls of power electronics. Type 3 (dual-fed) wind turbines, in particular, are susceptible to this type of interaction. If not properly damped, the oscillations can be unstable and lead to trips of the wind plant. Thus, the present disclosure is directed to a method for providing damping of the sub-synchronous resonance grid-forming control structure. In particular, the present disclosure involves adding a 'virtual resistance' in series with the voltage source produced by the grid-forming controls.

Referring now to the drawings, FIG. 2 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 3) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Referring now to FIG. 2, a simplified, internal view of one embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Referring now to FIG. 4, a schematic diagram of one embodiment of a wind turbine power system 100 is illustrated in accordance with aspects of the present disclosure. Although the present disclosure will generally be described herein with reference to the system 100 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 4 and as mentioned, the rotor 18 of the wind turbine 10 (FIG. 2) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g., three-phase) alternating current (AC) power is provided to the power converter 106. The rotor side converter 112 converts the AC power provided from the rotor bus 108 into direct current (DC) power and provides the DC power to the DC link 116. As is generally understood, switching elements (e.g., IGBTs) used in the bridge circuits of the rotor side converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g., IGBTs) used in bridge circuits of the line side converter 114 can be modulated to convert the DC power on the DC link 116 into AC power on the line side bus 110. The AC power from the power converter 106 can be combined with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring now to FIG. 5, the wind turbine power system 100 described herein may be part of a wind farm 50. As shown, the wind farm 50 may include a plurality of wind turbines 52, including the wind turbine 10 described above, and an overall farm-level controller 56. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the turbine controllers of the plurality of wind turbines 52 are communicatively coupled to the farm-level controller 56, e.g., through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 52, such as for example, distributing real and/or reactive power demands across the wind turbines 52 of the wind farm 50.

Referring now to FIG. 6, a block diagram of one embodiment of suitable components that may be included within the controller (such as any one of the converter controller 120, the turbine controller 26, and/or the farm-level controller 56 described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

Referring now to FIGS. 7 and 8, a system 200 and method 250 for providing grid-forming control of a double-fed generator of a wind turbine according to the present disclosure is illustrated. FIG. 7 illustrates a schematic diagram of one embodiment of the system 200 according to the present disclosure, particularly illustrating a one-line diagram of the DFIG 102 with a high-level control structure for grid-forming characteristics. FIG. 8 illustrates a flow diagram of one embodiment of method 250 for providing grid-forming control of the DFIG 102.

Referring particularly to FIG. 7, the system 200 may include many of the same features of FIG. 4 described herein, with components having the same reference characters representing like components. Further, as shown, the system 200 may include a control structure for controlling the line-side converter that is similar to the control structure shown in FIG. 1. More particularly, as shown, the line-side converter control structure may include a DC voltage regulator 212 and a line current regulator 214. As such, the DC voltage regulator 212 is configured to generate line-side current commands (e.g., ILCmdx) for the line current regulator 214. The line current regulator 214 then generates line-side voltage commands (e.g., VLCmdx, VLCmdy) for a modulator 218. The modulator 218 also receives an output (e.g., a phase-locked loop angle, $\theta_{PLL}$) from a phase-locked loop 216 to generate one or more gate pulses for the line-side converter 114. The phase-locked loop 216 typically generates its output using a voltage feedback signal.

Furthermore, as shown, the system 200 may also include a unique control structure for controlling the rotor-side converter 112 using grid-forming characteristics. In particular, as shown in FIG. 7, the system 200 may include a stator voltage regulator 206 for providing such grid-forming characteristics. In addition, as shown, the system 200 may include a grid voltage/VAR regulator 202, an inertial power regulator 204, a rotor current regulator 208, and a modulator 210. Thus, in an embodiment, as shown, the system 200 is configured to determine voltage command(s) (e.g., VS_MAG_Cmd, VS_ANGLE_Cmd) via the voltage/VAR regulator 202 and/or the inertial power regulator 204 using, e.g., one or more reference commands from an external controller. In such embodiment, the external controller may include, for example, the turbine controller 26 of the wind turbine 10 or the farm-level controller 56 of the wind farm 50. Moreover, as shown, the reference command(s) may include at least one of a voltage reference (e.g., VT_Ref) or VAR reference from the farm-level controller 56 and/or a power reference (e.g., Power_Ref) from the turbine controller 26.

Still referring to FIG. 7, the stator voltage regulator 206 of the system 200 is configured to determine one or more rotor current commands (e.g., IRCmdy and IRCmdx) as a function of a magnetizing current command 238 and/or a stator current feedback signal 240 of the DFIG 102. It should be understood that the stator feedback current 240 is a strong indicator of the characteristics of the externally connected power system, i.e., the grid. Therefore, the stator feedback current 240 can be used as a feedback signal to decouple the response of stator voltage to variations to the nature of the grid. Further details of the stator voltage regulator 206 can be better understood with respect to FIGS. 9 and 10. Thus, the output(s) (e.g., rotor current commands IRCmdy, IPCmdx) from the stator voltage regulator 206 can be implemented in the rotor current regulator 208 by generating rotor voltage commands (e.g., VRCmdx and VRCmdy) for a modulator 210. The modulator 210 also receives the phase-locked loop angle from the phase-locked loop 216 and a reference angle (e.g., $\theta_{FFBK}$) to generate one or more gate pulses for the rotor-side converter 112.

Series capacitors are often installed in long-distance AC transmission lines to boost the power transfer capability of the lines. The series capacitor creates a resonant circuit, which may interact with the converter controls of power electronics. Dual-fed wind turbines, such as those illustrated in FIG. 7, can be susceptible to this type of interaction. If not properly damped, the oscillations can be unstable and lead to trips of the wind farm 50. Thus, systems and methods of the present disclosure are directed to providing damping of the sub-synchronous resonance grid-forming control structure, such as the structure illustrated in FIG. 7.

In particular, and referring now to FIG. 8, a flow diagram of one embodiment of the method 250 for damping sub-synchronous control interactions (SSCI) in a grid-forming inverter-based resource connected to an electrical grid is provided. In general, the method 250 is described herein with reference to the wind turbine 10 of FIGS. 2-7. However, it should be appreciated that the disclosed method 250 may be implemented with wind turbines having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (252), the method 250 includes receiving, via a controller, a current feedback signal in a synchronous reference frame. As shown at (254), the method 250 includes rotating, via the controller, the current feedback signal to a new reference frame associated with a sub-synchronous frequency range. As shown at (256), the method 250 includes determining, via the controller, a sub-synchronous component of the current feedback signal. As shown at (258), the method 250 includes rotating, via the controller, the sub-synchronous component of the current feedback signal back to the synchronous reference frame. As shown at (260), the method 250 includes determining, via the controller, a voltage command associated with sub-synchronous damping for the inverter-based resource as a function of the sub-synchronous component and a virtual resistance setting.

As shown at (262), the method 250 includes controlling, via the controller, the inverter-based resource, based at least in part, on the voltage command associated with the sub-synchronous damping.

For example, referring now to FIG. 9, a schematic diagram of an embodiment of a grid-forming control structure 300 according to the present disclosure is illustrated. In particular, as shown, the control structure 300 receives the current feedback signal 302 (e.g., IS_Fbk_xy) in a synchronous reference frame. The current feedback signal may include two components (both x and y components), with one component in phase with a local voltage reference and one component in quadrature with the local voltage reference. Further, as shown at 304, the current feedback signal 302 may be filtered to remove one or more fundamental frequency components. In particular, as shown, the control structure may include a high-pass filter 304 (or any other suitable filter or combination of filters) for filtering of the current feedback signal 302. Thus, as shown at 308, the control structure 300 is further configured to rotate the filtered current feedback signal 302 to a new reference frame associated with a sub-synchronous frequency range. For example, as shown, the filtered current feedback signal 302 may be rotated by the phase-locked loop angle 306.

Moreover, as shown at 310, 312, and 314, the control structure 300 may further determine a sub-synchronous component 315 of the current feedback signal 302. More specifically, as shown, the control structure 300 may further determine a sub-synchronous component of the current feedback signal 302 by applying a low-pass filter 310 and phase compensation 312, 314 to the current feedback signal 302 to obtain the sub-synchronous component 315. Thus, as shown at 316, the control structure 300 can then rotate the sub-synchronous component 315 of the current feedback signal 302 back to the synchronous reference frame, e.g., using a negative phase-locked loop angle 306.

Accordingly, the output 318 (e.g., IS_Dc_xy) can then be used by the control structure 300 to determine a voltage command 322 (e.g., VCmd_dc_xy) associated with sub-synchronous damping for the inverter-based resource as a function of the sub-synchronous component 315 and a virtual resistance setting 320. In such embodiments, the virtual resistance setting 320 may be a fixed value that is tuned as part of the normal control design process. More particularly, in an embodiment, the virtual resistance setting 320 (or the phase compensation 312) may be tuned to provide a positive damping effect over a certain frequency range (such as the sub-synchronous frequency range from about 5 Hz to about 30 Hz). Further, in an embodiment, the control structure 300 is configured to determine the voltage command 322 associated with the sub-synchronous damping by multiplying the output 318 by the virtual resistance setting 320 to obtain the voltage command 322.

Thus, as shown and explained in more detail with reference to FIG. 10, the voltage command 322 can be used by the stator voltage regulator 206 to control the inverter-based resource. In particular, as shown in FIG. 10, a schematic diagram of an embodiment of example components of the stator voltage regulator 206 is illustrated. In the illustrated embodiment, the signals are in x and y coordinates with reference to the terminal voltage phase angle. Complex variable notation is used for clarity. Further, as shown, the stator voltage regulator 206 may include a predictive path 220 and a corrector path 222. Thus, as shown at the start of the predictive path 220, the stator voltage regulator 206 is configured to receive a higher level command (e.g., $E_I$) for magnitude of the stator voltage and a higher level command (e.g., $\delta_{IT}$) for angle of the stator voltage with respect to the phase-locked loop angle. Further, continuing along the predictive path 220, the stator voltage regulator 206 can then convert the voltage command(s) to a stator voltage command 231 (e.g., VS_Cmd_xy) as shown at 224. As shown at 233, the stator voltage regulator 206 is configured to determine a sum 235 (or total voltage command) of the stator voltage command 231 and the voltage command 322 associated with the sub-synchronous damping (from FIG. 9). As shown at 226, the stator voltage regulator 206 may then determine a magnetizing current feed forward signal 239 (e.g., IM_FF_xy) as a function of the sum 235 and a magnetizing admittance 237 (e.g., jBmag 226). In one embodiment, for example, the magnetizing admittance 237 may correspond to a magnetizing susceptance. As such, the magnetizing current feed forward signal 239 is configured to facilitate a rapid response of stator voltage to the stator voltage command.

Referring particularly to the corrective path 222, the stator voltage regulator 206 may also receive a stator voltage feedback signal 225 (e.g., VS_Fbk_xy) and a stator current feedback signal 227 (e.g., IS_Fbk_xy). Thus, as shown at 230, the stator voltage regulator 206 is configured to sum the stator voltage feedback signal 225 and the stator current feedback signal 227 to determine a voltage magnitude feedback signal 229 (e.g., VM_Fbk_xy). Moreover, as shown at 231, the stator voltage regulator 206 is configured to determine a difference between the voltage magnitude feedback signal 229 and the total voltage command 235 from the predictive path 220.

Thus, in an embodiment, as shown, the stator voltage regulator 206 may also determine a magnetizing current correction signal 241 (e.g., IM_Corr_xy) via a proportional-integral regulator 232. Accordingly, as shown at 228 in the predictive path 220, the stator voltage regulator 206 can then add the magnetizing current feed forward signal 239 to the magnetizing current correction signal 241 to determine the magnetizing current command 238 (e.g., IM_Cmd_xy). In alternative embodiments, the magnetizing current command 238 may be a constant value.

Furthermore, as shown at 234, the stator voltage regulator 206 may determine the rotor current command(s) 242 (e.g., IR_Cmd_xy) as a function of the magnetizing current command 238 (e.g., IS_Fbk_xy) and the stator current feedback signal 240 (e.g., IS_Fbk_xy) of the DFIG 102. For example, in an embodiment, the stator current feedback signal 240 of the DFIG 102 may be measured. Thus, in an embodiment, the measured stator current signal 240 of the DFIG 102 may be fed into a rotor current command of the DFIG 102, as shown at 234, so as to substantially decouple a stator responsive stator voltage from one or more grid characteristics. More specifically, in particular embodiments, as shown, the stator voltage regulator 206 may determine the rotor current command(s) 242 by adding the magnetizing current command 238 to the measured stator current feedback signal 240. In addition, as shown, a limiter 236 may place limits to the rotor current command 242 as appropriate to respect equipment rating(s).

Further aspects of the invention are provided by the subject matter of the following clauses:

Clause 1. A method for damping sub-synchronous control interactions (SSCI) in a grid-forming inverter-based resource connected to an electrical grid, the method comprising:

receiving, via a controller, a current feedback signal in a synchronous reference frame;

rotating, via the controller, the current feedback signal to a new reference frame associated with a sub-synchronous frequency range;

determining, via the controller, a sub-synchronous component of the current feedback signal;

rotating, via the controller, the sub-synchronous component of the current feedback signal back to the synchronous reference frame;

determining, via the controller, a voltage command associated with sub-synchronous damping for the inverter-based resource as a function of the sub-synchronous component and a virtual resistance setting; and controlling, via the controller, the inverter-based resource, based at least in part, on the voltage command associated with the sub-synchronous damping.

Clause 2. The method of clause 1, further comprising filtering the current feedback signal to remove one or more fundamental frequency components before rotating the current feedback signal to the new reference frame.

Clause 3. The method of clause 2, further comprising completing the filtering of the current feedback signal via a high-pass filter.

Clause 4. The method of any of the preceding clauses, wherein determining the sub-synchronous component of the current feedback signal further comprises:

applying a low-pass filter and phase compensation to the current feedback signal to obtain the sub-synchronous component.

Clause 5. The method of any of the preceding clauses, wherein determining the voltage command associated with the sub-synchronous damping for the inverter-based resource as a function of the sub-synchronous component and the virtual resistance setting further comprises:

multiplying the sub-synchronous component by the virtual resistance setting to obtain the voltage command associated with the sub-synchronous damping.

Clause 6. The method of clause 4, further comprising tuning at least one of the virtual resistance setting or the phase compensation to provide a positive damping effect over a certain frequency range.

Clause 7. The method of any of the preceding clauses, wherein controlling the inverter-based resource, based at least in part, on the voltage command associated with the sub-synchronous damping further comprises:

adding the voltage command associated with the sub-synchronous damping to a fundamental frequency voltage command from grid-forming controls of the inverter-based resource to obtain a total voltage command;

determining a rotor current command as a function of the total voltage command; and controlling the inverter-based resource based on the rotor current command.

Clause 8. The method of any of the preceding clauses, wherein the inverter-based resource comprises at least one of a wind turbine power system, a solar power system, an energy storage power system, or combinations thereof.

Clause 9. The method of clause 9, wherein the controller comprises at least one of a turbine controller or a converter controller of the wind turbine power system.

Clause 10. A method for damping sub-synchronous control interactions (SSCI) in a grid-forming inverter-based resource connected to an electrical grid, the method comprising:

receiving, via a controller, a feedback signal in a synchronous reference frame; determining, via the controller, a sub-synchronous component of the feedback signal;

applying, via the controller, a virtual resistance setting to the sub-synchronous component to obtain a voltage command associated with sub-synchronous damping for the inverter-based resource; and controlling, via the controller, the inverter-based resource, based at least in part, on the voltage command associated with the sub-synchronous damping.

Clause 11. A converter controller for damping sub-synchronous control interactions (SSCI) in a grid-forming inverter-based resource connected to an electrical grid, the converter controller comprising:

at least one controller comprising at least one processor, the at least one processor configured to perform a plurality of operations, the plurality of operations comprising:

receiving a current feedback signal in a synchronous reference frame;

rotating the current feedback signal to a new reference frame associated with a sub-synchronous frequency range;

determining a sub-synchronous component of the current feedback signal; rotating the sub-synchronous component of the current feedback signal back to the synchronous reference frame;

determining a voltage command associated with sub-synchronous damping for the inverter-based resource as a function of the sub-synchronous component and a virtual resistance setting; and controlling the inverter-based resource, based at least in part, on the voltage command associated with the sub-synchronous damping.

Clause 12. The converter controller of clause 11, wherein the plurality of operations further comprise:

filtering the current feedback signal to remove one or more fundamental frequency components before rotating the current feedback signal to the new reference frame.

Clause 13. The converter controller of clause 12, wherein the plurality of operations further comprise:

completing the filtering of the current feedback signal via a high-pass filter.

Clause 14. The converter controller of clauses 11-13, wherein determining the sub-synchronous component of the current feedback signal further comprises:

applying a low-pass filter and phase compensation to the current feedback signal to obtain the sub-synchronous component.

Clause 15. The converter controller of clauses 11-14, wherein determining the voltage command associated with the sub-synchronous damping for the inverter-based resource as a function of the sub-synchronous component and the virtual resistance setting further comprises:

multiplying the sub-synchronous component by the virtual resistance setting to obtain the voltage command associated with the sub-synchronous damping.

Clause 16. The converter controller of clause 14, wherein the plurality of operations further comprise:

tuning at least one of the virtual resistance setting or the phase compensation to provide a positive damping effect over a certain frequency range.

Clause 17. The converter controller of clauses 11-16, wherein controlling the inverter-based resource, based at least in part, on the voltage command associated with the sub-synchronous damping further comprises:

adding the voltage command associated with the sub-synchronous damping to a fundamental frequency voltage command from grid-forming controls of the inverter-based resource to obtain a total voltage command;

determining a rotor current command as a function of the total voltage command; and controlling the inverter-based resource based on the rotor current command.

Clause 18. The converter controller of clauses 11-17, wherein the inverter-based resource comprises at least one of a wind turbine power system, a solar power system, an energy storage power system, or combinations thereof.

Clause 19. The converter controller of clause 18, wherein the controller comprises at least one of a turbine controller or a converter controller of the wind turbine power system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for damping sub-synchronous control interactions (SSCI) in a grid-forming inverter-based resource connected to an electrical grid, the method comprising:

determining, via a controller, a current feedback signal associated with a sub-synchronous frequency range, the sub-synchronous frequency range comprising frequencies from about 5 Hz to about 30 Hz;

determining, via the controller, a sub-synchronous component of the current feedback signal by applying a filter and a phase compensation to the current feedback signal to obtain the sub-synchronous component;

determining, via the controller, a voltage command associated with sub-synchronous damping for the grid-forming inverter-based resource as a function of the sub-synchronous component and a virtual resistance setting, the virtual resistance setting being a fixed value tuned to provide a positive damping effect over a certain frequency range; and controlling, via the controller, the grid-forming inverter-based resource, based at least in part, on the voltage command associated with the sub-synchronous damping.

2. The method of claim 1, further comprising filtering the current feedback signal to remove one or more fundamental frequency components before rotating the current feedback signal to a new reference frame.

3. The method of claim 2, further comprising completing the filtering of the current feedback signal via a high-pass filter.

4. The method of claim 1, wherein determining the sub-synchronous component of the current feedback signal further comprises:

applying a low-pass filter and the phase compensation to the current feedback signal to obtain the sub-synchronous component.

5. The method of claim 1, wherein determining the voltage command associated with the sub-synchronous damping for the grid-forming inverter-based resource as a function of the sub-synchronous component and the virtual resistance setting further comprises:

multiplying the sub-synchronous component by the virtual resistance setting to obtain the voltage command associated with the sub-synchronous damping.

6. The method of claim 4, further comprising tuning at least one of the virtual resistance setting or the phase compensation to provide the positive damping effect over the certain frequency range.

7. The method of claim 1, wherein controlling the grid-forming inverter-based resource, based at least in part, on the voltage command associated with the sub-synchronous damping further comprises:

adding the voltage command associated with the sub-synchronous damping to a fundamental frequency voltage command from grid-forming controls of the grid-forming inverter-based resource to obtain a total voltage command;

determining a rotor current command as a function of the total voltage command; and controlling the grid-forming inverter-based resource based on the rotor current command.

8. The method of claim 1, wherein the grid-forming inverter-based resource comprises at least one of a wind turbine power system, a solar power system, an energy storage power system, or combinations thereof.

9. The method of claim 8, wherein the controller comprises at least one of a turbine controller or a converter controller of the wind turbine power system.

10. A method for damping sub-synchronous control interactions (SSCI) in a grid-forming inverter-based resource connected to an electrical grid, the method comprising:

determining, via a controller, a feedback signal associated with a sub-synchronous frequency range, the sub-synchronous frequency range comprising frequencies from about 5 Hz to about 30 Hz;

determining, via the controller, a sub-synchronous component of the feedback signal by applying a filter and a phase compensation to the feedback signal to obtain the sub-synchronous component;

applying, via the controller, a virtual resistance setting to the sub-synchronous component to obtain a voltage command associated with sub-synchronous damping for the grid-forming inverter-based resource, the virtual resistance setting being a fixed value tuned to provide a positive damping effect over a certain frequency range; and controlling, via the controller, the grid-forming inverter-based resource, based at least in part, on the voltage command associated with the sub-synchronous damping.

11. A converter controller for damping sub-synchronous control interactions (SSCI) in a grid-forming inverter-based resource connected to an electrical grid, the converter controller comprising:

at least one controller comprising at least one processor, the at least one processor configured to perform a plurality of operations, the plurality of operations comprising:

determining a current feedback signal associated with a sub-synchronous frequency range, the sub-synchronous frequency range comprising frequencies from about 5 Hz to about 30 Hz;

determining a sub-synchronous component of the current feedback signal by applying a filter and a phase compensation to the current feedback signal to obtain the sub-synchronous component;

determining a voltage command associated with sub-synchronous damping for the grid-forming inverter-based resource as a function of the sub-synchronous component and a virtual resistance setting, the virtual resistance setting being a fixed value tuned to provide a positive damping effect over a certain frequency range; and controlling the grid-forming inverter-based resource, based at least in part, on the voltage command associated with the sub-synchronous damping.

12. The converter controller of claim 11, wherein the plurality of operations further comprise:

filtering the current feedback signal to remove one or more fundamental frequency components before rotating the current feedback signal to a new reference frame.

13. The converter controller of claim 12, wherein the plurality of operations further comprise:

completing the filtering of the current feedback signal via a high-pass filter.

14. The converter controller of claim 11, wherein determining the sub-synchronous component of the current feedback signal further comprises:

applying a low-pass filter and the phase compensation to the current feedback signal to obtain the sub-synchronous component.

15. The converter controller of claim 11, wherein determining the voltage command associated with the sub-synchronous damping for the grid-forming inverter-based resource as a function of the sub-synchronous component and the virtual resistance setting further comprises:

multiplying the sub-synchronous component by the virtual resistance setting to obtain the voltage command associated with the sub-synchronous damping.

16. The converter controller of claim 14, wherein the plurality of operations further comprise:

tuning at least one of the virtual resistance setting or the phase compensation to provide the positive damping effect over the certain frequency range.

17. The converter controller of claim 11, wherein controlling the grid-forming inverter-based resource, based at least in part, on the voltage command associated with the sub-synchronous damping further comprises:

adding the voltage command associated with the sub-synchronous damping to a fundamental frequency voltage command from grid-forming controls of the grid-forming inverter-based resource to obtain a total voltage command;

determining a rotor current command as a function of the total voltage command; and controlling the grid-forming inverter-based resource based on the rotor current command.

18. The converter controller of claim 11, wherein the grid-forming inverter-based resource comprises at least one of a wind turbine power system, a solar power system, an energy storage power system, or combinations thereof.

19. The converter controller of claim 18, wherein the controller comprises at least one of a turbine controller or a converter controller of the wind turbine power system.

* * * * *